Feb. 5, 1935.　　　L. H. THOEN　　　1,990,054
HEADER PICK-UP
Filed Nov. 2, 1927　　　3 Sheets-Sheet 1

INVENTOR
Lowell H. Thoen
BY
White, Prost & Fryer
ATTORNEYS

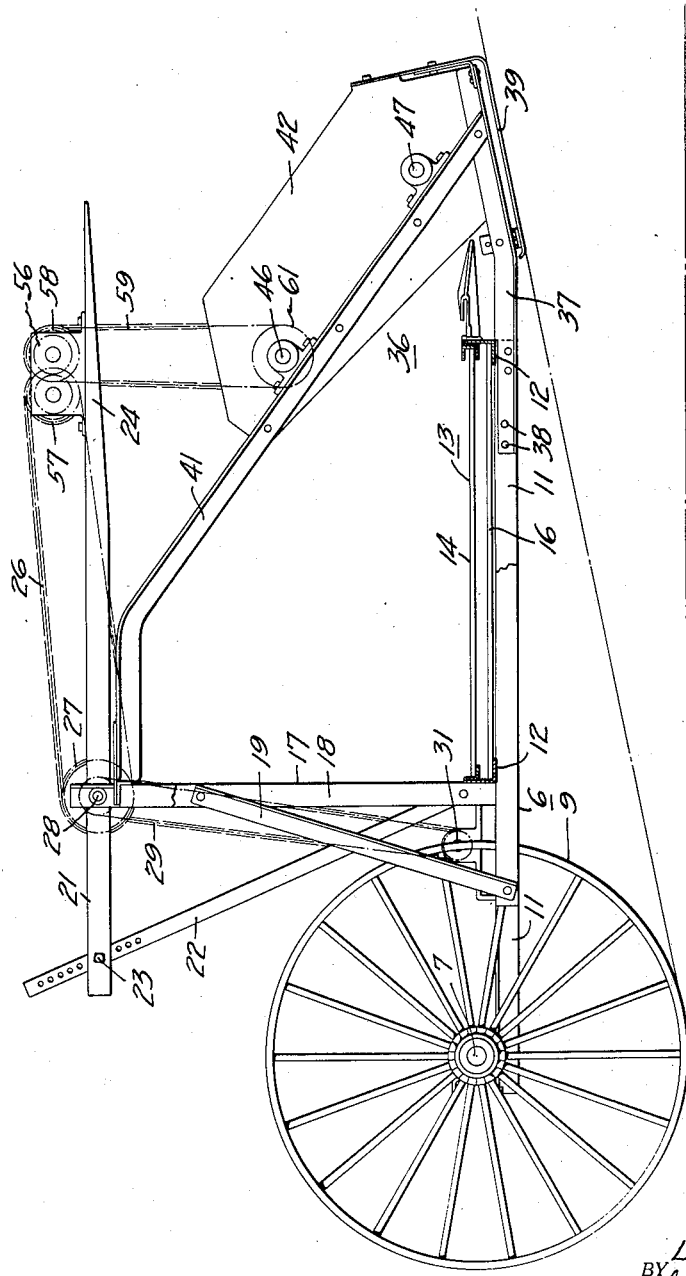

Feb. 5, 1935. L. H. THOEN 1,990,054
HEADER PICK-UP
Filed Nov. 2, 1927 3 Sheets-Sheet 3
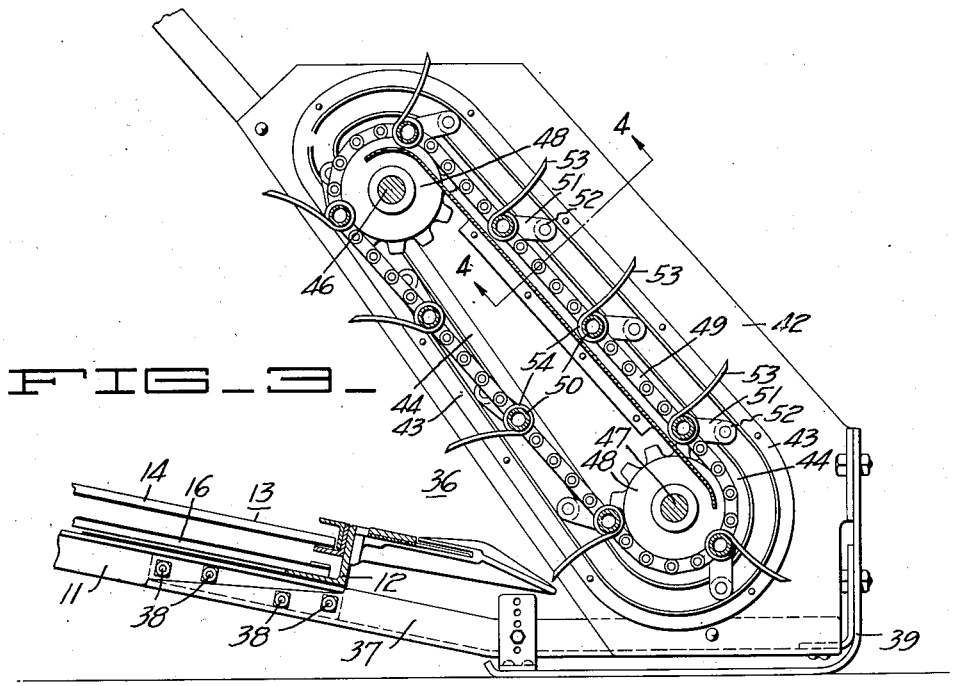
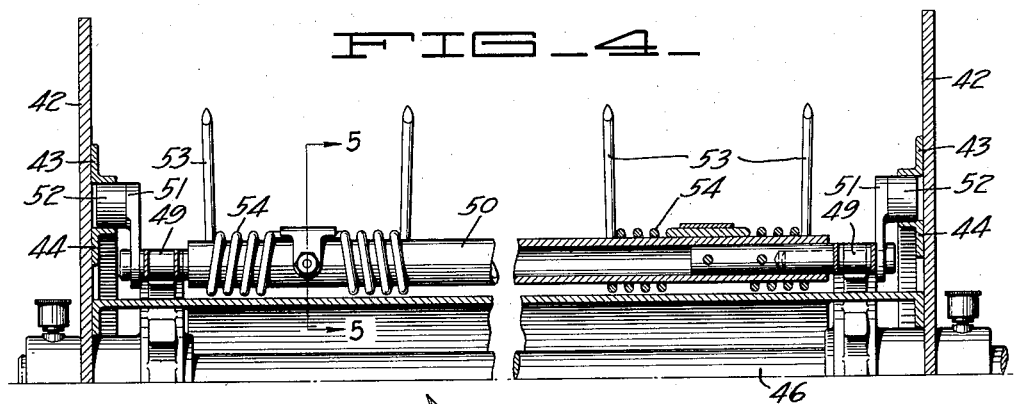
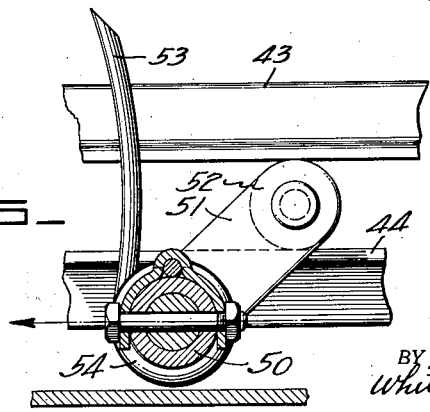
INVENTOR
Lowell H. Thoen
ATTORNEYS Patented Feb. 5, 1935

1,990,054

UNITED STATES PATENT OFFICE 1,990,054

HEADER PICK-UP

Lowell H. Thoen, Stockton, Calif., assignor, by mesne assignments, to Caterpillar Tractor Co., San Leandro, Calif., a corporation of California Application November 2, 1927, Serial No. 230,458

10 Claims. (Cl. 56—364)

My invention relates to harvesting machinery and is especially concerned with an attachment to be placed on a header to permit the header to gather grain which has been cut and left on the field in windrows.

Under some conditions of grain harvesting, sometimes due to the condition of the grain itself, it is advisable to cut the grain and permit it to lie in windrows upon the field to cure. After it is cured it is threshed. Such circumstances preclude the use of the ordinary combined harvester which is capable only of cutting standing grain and threshing it as it is cut. In the copending application of Jacob Clove, Serial No. 186,138, entitled Pick-up header, which issued as Patent No. 1,891,748, on December 20, 1932, there is shown a machine which is capable of picking up grain lying in windrows in the field and delivering it to a threshing mechanism. While this machine performs its functions admirably, the header portion of it is a unit entirely separate and distinct from the standard header of a combined harvester and in order to have the advantages of this pick-up, a user must obtain a complete pick-up header. This requires the investment of a considerable amount of capital. Unless a user has both a standard header and a pick-up header, he is considerably handicapped in the ways in which he can handle his grain crop and cannot treat it with the flexibility possible if he had both of the units.

It is therefore an object of my invention to provide an attachment to a standard header which will afford it the attributes of a pick-up header.

Another object of my invention is to provide a header pick-up readily detachable from and attachable to a standard header and deriving its driving power therefrom.

My invention possesses other advantageous features some of which with the foregoing will be set forth at length in the following description where I shall outline in full that form of the pick-up header of my invention which I have selected for illustration in the drawings accompanying and forming part of the present specification. In said drawings I have shown one form of header pick-up embodying my invention, but it is to be understood that I do not limit myself to such form since the invention, as set forth in the claims may be embodied in a plurality of forms.

In the drawings:

Fig. 2 is a cross section on the line 2—2 of Fig. 1.

Fig. 3 is a cross section of Fig. 1 on the line 3—3.

Fig. 4 is an enlarged detail of the tangs of the pick-up mechanism, the plane of section being indicated by line 4—4 of Fig. 3.

Fig. 5 is a cross section on the line 5—5 of Fig. 4.

Figure 1:
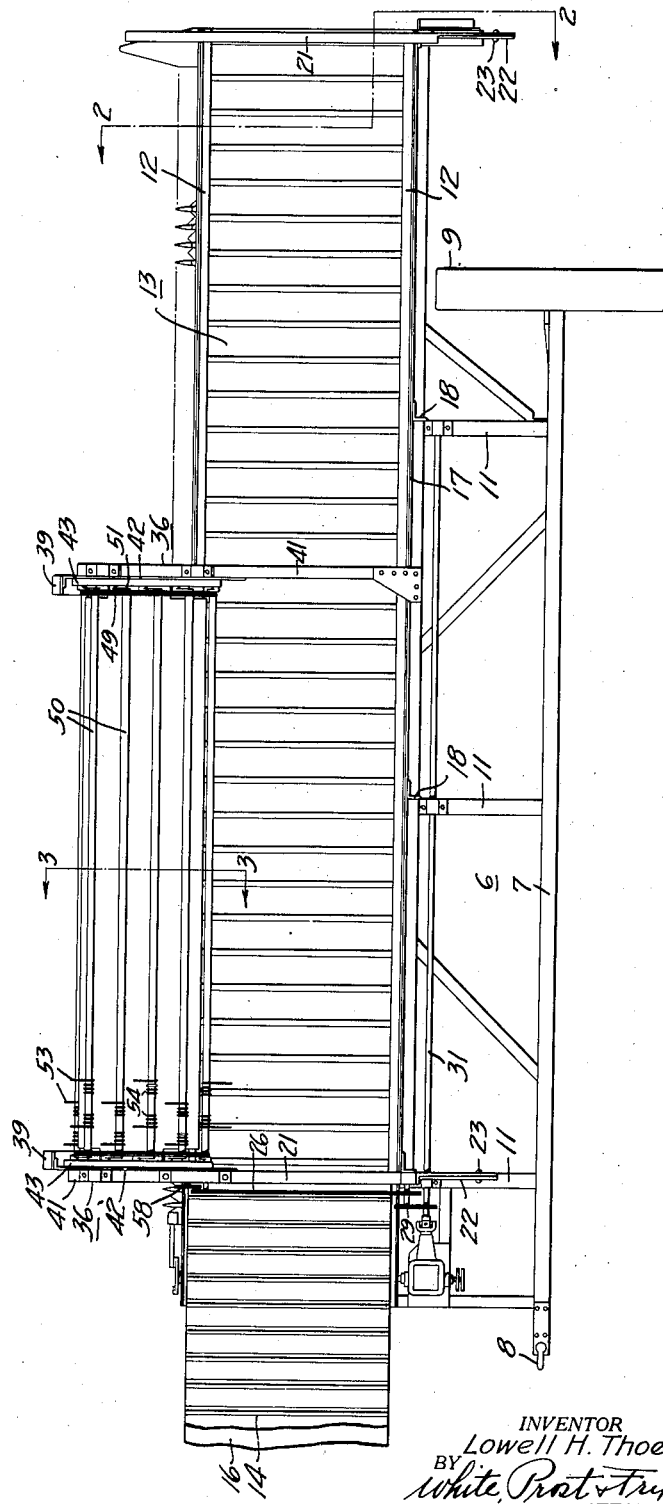
Fig. 1 is a plan of the header pick-up of my invention.

In its preferred form, the header pick-up of my invention preferably comprises pick-up mechanism detachably secured to and driven from a header which is standard except that the reel is omitted.

The standard header usually used with my invention preferably comprises a framework 6 composed of a plurality of angles and channels fastened together to form a substructure. Included in the framework is an axle 7 having at one end a hook 8 designed to be engaged with a thresher unit of a combined harvester and having at its other end a ground engaging wheel 9. Secured to the axle by beams 11 are angles 12 nested to form channels for a draper 13. The draper preferably comprises, as is customary, a continuous belt having an upper run 14 and a lower run 16. The draper extends for the full length of the framework 6 and discharges at one end into the feeder house, not shown, of the combined harvester.

Running parallel to the draper is a backboard 17 erected upon uprights 18 forming a portion of the framework 6. The backboard uprights are braced by struts 19 extending to the beams 11. Pivotally mounted at widely separated points on the framework 6 at the upper ends of the uprights 18 are a pair of reel beams 21. The reel beams are maintained in any selected position by rods 22 secured at their lower ends to the framework 6 and pierced at their upper ends in a plurality of places to receive fastening bolts 23. By suitably positioning the bolts 23 in the apertures, the forward ends of the reel beams can be raised or lowered to the desired extent to give the preferred adjustment of the reel.

In a standard header, the reel, not shown, is journaled on the reel beams 21 proximate the forward ends, as at 24. The reel is driven in a clockwise direction, in Fig. 2, by a chain 26 which engages a sprocket on the end of the reel shaft and also is in engagement with a sprocket 27 on a jack shaft 28 secured to the upper portion of the framework 6. A second chain 29 connects the jack shaft with the main shaft 31 driven from the thresher portion of the combined harvester and which also drives the sickle and the draper. As so far described, the header is a typical, standard construction.

When the header pick-up of my invention is attached to a standard header, the standard reel is first removed. In the space ordinarily occupied by at least a portion of the reel, I place the pick-up mechanism for lifting the grain from windrows on the ground and conveying it to the draper. This mechanism preferably includes a pick-up framework 36 comprising usually forward extensions 37 fastened to the beams 11 by nuts and bolts 38 and carrying skids 39 for contacting with the ground. To reinforce the structure, braces 41 are connected at their lower ends to the skids 39 and extend rearwardly over the draper to the uprights 18 of the backboard. The fastenings between the uprights and the braces 41 are preferably by nuts and bolts so as to be easily detachable.

On each of the braces 41 is mounted an end board 42, to the inner face of which angles 43 and 44 forming a track are affixed. A pair of cross shafts 46 and 47 carrying sprockets 48 adjacent the end boards are journaled within the confines of the track. Around each pair of sprockets is mounted a chain 49 carrying at intervals thereon journals for the reception of cross bars 50 extending preferably for the width of the pick-up mechanism. Each end of each of the bars 50 is provided with a crank 51 to which is affixed a roller 52 running in the track formed by the angles 43 and 44. Inasmuch as the track contour and the contour of the chain 49 are not similar, there is a rotary motion imparted to the progressing bars 50 as the sprockets 48 rotate.

Tangs 53 are mounted at intervals thruout the length of each of the bars 50. The tangs preferably are formed by a single length of wire clamped at its midportion to the bar and spirally wound about the bar to form a coil spring 54. The end of the coil spring is permitted to project from the bar in substantially a tangential direction and is pointed at its tip to form a yielding, resilient tang. Upon rotation of the sprockets 48, the tangs are moved in a circuit from near the ground, along the upper side of the pick-up mechanism, and over the top thereof to discharge any grain they may have engaged onto the draper lying immediately below. The rotation imparted to the bars during the movement of the chain is effective in withdrawing the tangs from engagement with grain being discharged over the brink of the pick-up mechanism.

To make the fullest use of the mechanism available on a standard header and also to afford a convenient means for driving the header pick-up of my invention, I preferably install a reversing gear 56 on one of the reel beams 21 in approximately the position 24 previously occupied by a journal for the reel. The chain 26 is engaged with a sprocket 57 forming part of the change gear and drives in a counterclockwise direction, as seen in Fig. 2, a sprocket 58. This propels a chain 59 in engagement with another sprocket 61 mounted to turn the shaft 46. The standard reel drive is thus reversed in direction and is connected to my pick-up mechanism so that the pick-up mechanism is driven at the proper rate of speed and in the proper direction as the harvester is advanced.

It will be appreciated that with my invention, a relatively cheap header pick-up is provided by mechanism which utilizes the principal part of a standard header and which can easily and quickly be attached and detached therefrom, thereby economically affording a user a great degree of flexibility in the method of handling his grain.

I claim:

1. The combination with a mobile combined harvester-thresher having a header, a draper on said header, frame means extending forwardly over said draper, and reel driving means carried by said frame means, of a pick-up unit connected to said header in front of said draper instead of the reel, said pick-up unit being positioned below said frame means, and a driving connection extending downwardly from said reel driving means to said pick-up unit.

2. A header pick-up comprising a header frame including a draper, ground skids projecting from said frame, a brace on said skids extending rearwardly over said draper and connected to said frame, and pick-up mechanism supported by said skids and brace.

3. A header pick-up comprising a header frame, a draper on said frame, ground skids projecting from the leading edge of said frame, braces extending from said skids to said frame rearwardly over said draper, and pick-up mechanism wholly supported by said skids and braces.

4. In a harvester, a header, comprising a first frame to support a draper and a sickle, and a second frame to support a backboard and a reel, a pick-up mechanism having a frame attachable to said first and second frames.

5. In a harvester, a header frame, comprising a portion extending along the ground and a portion substantially normal thereto, and a pick-up frame attachable to said header frame portions.

6. In a harvester, a header frame having uprights thereon, a pick-up frame attachable to said frame and said uprights in a position inclined with respect to the ground.

7. In a harvester, a header frame, a reel frame thereon, a pick-up mechanism on said header frame and driving means therefor on said reel frame.

8. In a harvester, a header frame, an auxiliary frame thereon, a pick-up mechanism on said header and driving means for said pick-up on said auxiliary frame.

9. In a harvester, a header frame, an auxiliary frame attached thereto, means for adjusting the position of said auxiliary frame relative to said header frame, a pick-up mechanism, and a chain and sprocket drive therefor mounted on said auxiliary frame.

10. The combination with a mobile combined harvester-thresher having a standard header adapted to support a reel, of a pick-up unit detachably connected to said header instead of the reel, said pick-up unit comprising frame members, a pick-up comprising an endless series of tangs carried by said members and adapted to move adjacent the ground for collecting material from the ground, means for moving the tangs in a closed path, and means for imparting to said tangs during such movement an additional angular movement when the tangs are adjacent the ground.

LOWELL H. THOEN.